2,702,880

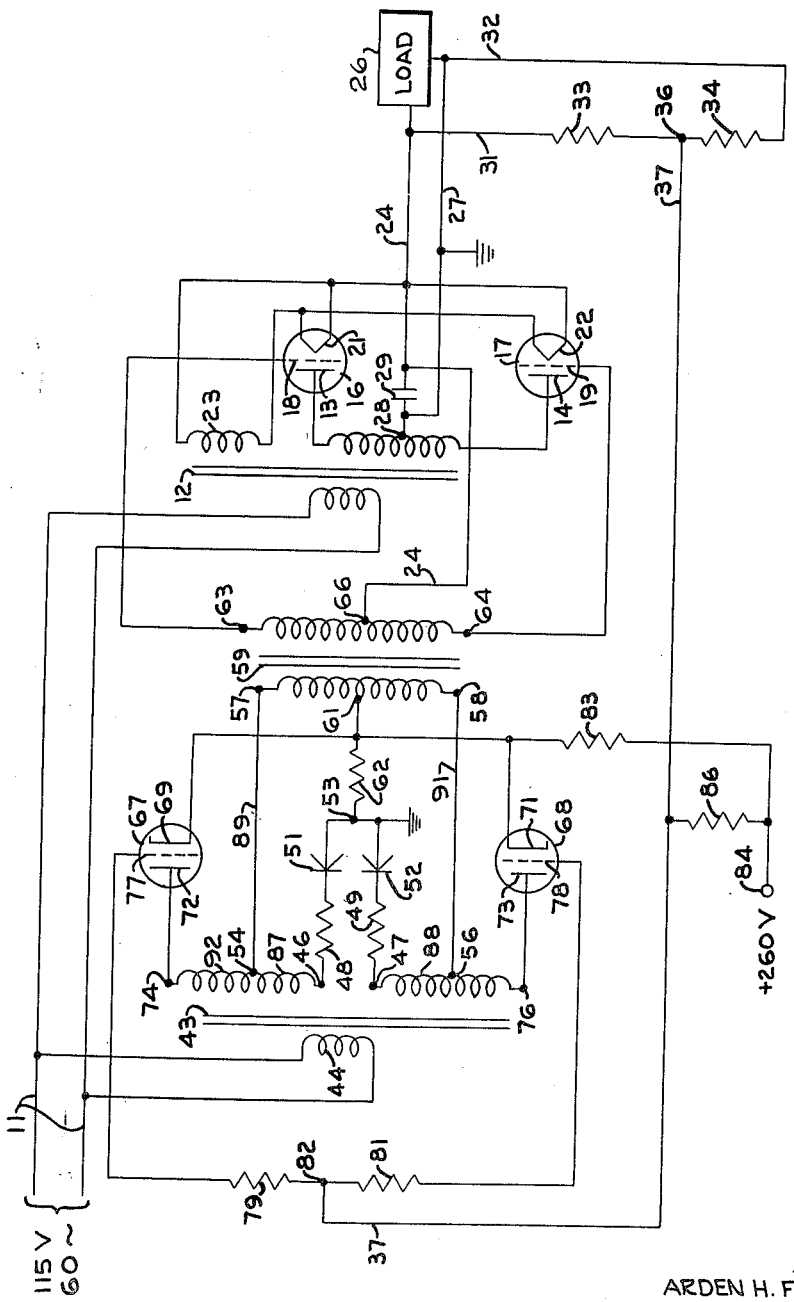

REGULATED POWER SUPPLY

Arden H. Fredrick, Mount Kisco, N. Y., assignor to General Precision Laboratory Incorporated, a corporation of New York Application March 17, 1954, Serial No. 416,876

4 Claims. (Cl. 321—18)

This invention relates to the regulation of power supplies and more particularly to the regulation of the output voltage of a direct-current power supply in accordance with some selected function of an electrical quantity of its load.

The usefulness of power supply circuits employing gas tube rectifiers is limited by the fact that such tubes require a certain time for deionization. This limits the maximum supply frequency that can be employed and also limits the speed of response of automatic voltage regulating circuits employed with the power supply. One way in which rapid control can be secured over wide ranges of input power, line frequency, and wave shape is to employ high vacuum or hard rectifying tubes instead of gas tubes. As one result, instead of being limited to line frequencies no higher than about 420 cycles per second, control operations at line frequencies of many thousands of cycles per second are possible.

One use of a supply circuit employing this invention is in connection with pulse circuits having a pulse repetition frequency of some thousands of pulses per second. Such pulse circuits are employed, for example, to power magnetron pulsed microwave generators.

The present invention employs high-vacuum grid-controlled rectifying tubes, and insulates the low-potential control circuit from the power supply voltage, which therefore may be as high as desired. The circuit of this invention also provides a direct-current output having a far lower harmonic content than is provided by grid controlled gas tube circuits, and in addition provides a higher transformer duty ratio.

The principal purpose of this invention is to provide a power supply capable of working from a high or low frequency supply line having high speed of response combined with the ability to handle high powers and voltages.

Another purpose of this invention is to provide a high-power, direct-current regulated supply circuit employing high-vacuum rectifying tubes and providing an output of low harmonic content.

Still another purpose of this invention is to provide a regulated power supply circuit suitable for use with a magnetron pulsed microwave generator.

Further understanding of this invention may be secured from the detailed description and drawing, in which the single figure depicts schematically the circuit of the invention.

Referring now to the drawing, a source of electrical power of, for example, 115 volts at 60 C. P. S. represented by conductors 11, is applied to a power transformer 12. This transformer steps the voltage down or up to the level necessary to produce the required rectified output potential, for example, 4.2 kv. This 4.2 kv. potential is applied to the anodes 13 and 14 of two high-vacuum rectifying tubes 16 and 17 designed to rectify the required current at the specified potential. For higher potentials cascaded rectifying tubes may be required, and in general any conventional rectifying circuit employing grid-controlled high-vacuum rectifying tubes may be employed. The rectifying tubes 16 and 17 are provided with control grids 18 and 19 by which they may be biased to cutoff or caused to become adjustably conductive unidirectionally. The tube filaments 21 and 22 are operated from the filament winding 23 and serve as cathodes. A conductor 24 from the tube filament circuit to the load 26 constitutes the positive direct-current output terminal of the regulated power supply circuit. The return path from load to power supply is represented by conductor 27 to the transformer secondary winding center tap 28, and may be grounded. A condenser 29 bridging the load input serves as the power supply output filter, which may of course be more complex than this as dictated by the requirements.

The load input voltage variation or other electrical quantity variation, which it is desired to maintain in accordance with a selected function by control of the power supply circuit, is sampled through a circuit represented by conductor 31, with return 32 to conductor 27. The conductor 31 is directly connected to load input conductor 24 as shown when merely the load input potential is to be sampled but in other cases, such as when a modulated load is to be sampled after modulation, the conductor 31 is connected to a suitable point within the load circuit in a manner well understood in the art.

The sampling procedure in the case of high voltage supplies often consists merely of a simple proportional voltage reduction by a resistive voltage dividing network. Such a network is represented by the two resistors 33 and 34, with the output taken from their junction 36 through conductor 37. In other cases it may be desired to employ some other network such as a voltage-reducing network having a voltage output independent of frequency, and such a network may be composed of resistors 33 and 34 in combination with capacitors.

A control circuit is actuated by the potential applied to it from conductor 37 and applies a function thereof in terms of 60 C. P. S. potential to the control grids 18 and 19 of the grid-controlled rectifier tubes 16 and 17. This control circuit includes an input control transformer 43 having a primary winding 44 energized from the power mains 11. The two secondary windings of the transformer 43 are connected from end terminals 46 and 47 through resistors 48 and 49 to rectifiers 51 and 52, the remaining like terminals of the rectifiers 51 and 52 being connected together at junction 53 and grounded. The rectifiers 51 and 52 are preferably of the dry disc type, although any other type may be employed. Intermediate taps 54 and 56 of the secondary windings are connected to end terminals 57 and 58 of the primary winding of an output control transformer 59. The midtap 61 of the primary winding is connected through resistor 62 to junction 53. The secondary winding terminals 63 and 64 of output control transformer 59 are connected to the control grids 18 and 19 of the grid-controlled rectifier tubes 16 and 17, and the midterminal 66 of this winding is connected to the output conductor 24.

Two high vaccum control triodes 67 and 68 have their cathodes 69 and 71 connected together and to the midtap 61 of the primary winding of output control transformer 59. The anodes 72 and 73 of these triodes 67 and 68 are connected to the remaining end terminals 74 and 76 of the secondary windings of the input control transformer 43. The control grids 77 and 78 of triodes 67 and 68 are connected together through equal resistors 79 and 81, and the junction 82 of these resistors is connected to the conductor 37. The cathode bias potential, in this case serving as a reference potential, is secured from a voltage divider consisting of resistors 83 and 62 connected between a source of positive potential at terminal 84 and ground. The grid bias potential, in this case, is secured from conductor 37. The difference between the potential and the reference potential established at terminal 61 constitutes the error or controlling signal.

In the operation of the circuit, power applied from conductors 11 to transformer 12 makes the anodes 13 and 14 of the grid controlled rectifier tubes 16 and 17 alternately positive, so that if their control grids are sufficiently positive during the respective half-cycle periods, the two tubes will be alternately conductive and positive potential will appear on output conductor 24 relative to conductor 27, smoothed by condenser 29.

Power is also applied to input control transformer 43, inducing potential in its secondary windings 87 and 88. During the half cycle in which intermediate terminal 54 is positive relative to end terminal 46, current flows through conductor 89 to terminal 57 of transformer 59 and from midterminal 61 through resistor 62, rectifier 51 and resistor 48 back to terminal 46. Rectifier 52 blocks the flow of current through resistor 49. During the other half cycle current flows from intermediate terminal 56 through conductor 91 to terminal 58 of transformer 59, and from midterminal 61 through resistor 62, rectifier 52 and resistor 49 back to terminal 47, rectifier 51 blocking the flow of current through resistor 48. That is, during successive half cycles current successively flows in the two halves of the primary winding of transformer 59 inward toward midterminal 61. The secondary winding of transformer 59 therefore causes terminals 63 and 64 to be successively positive, making control grids 18 and 19 successively positive. Polarities are so arranged that these grids become positive synchronously with positive polarization of anodes 13 and 14 respectively. That is, during the time that each anode is positive its control grid is also positive and the tube is highly conductive.

The foregoing statement of the mode of operation assumes complete nonconductivity of triodes 67 and 68 and also assumes ideal transformers with no reactance, as well as the absence of stray and fixed capacitances which would affect the phase angle. However, in a practical circuit the presence of reactance does not materially affect operation under the conditions of automatic regulation hereinafter described.

In operation at equilibrium the triodes 67 and 68 will not have infinite impedance, but their control grids will be at such potentials relative to their cathodes as to give the triodes definite and substantially equal impedances. In the case of triode 67, when secondary terminal 54 is positive relative to terminal 46, then terminal 74 is also positive relative to terminal 54. Current flows from anode 72 to cathode 69 of triode 67 and to midterminal 61 of the primary winding of transformer 59, then through the primary winding to terminal 57 since the primary winding impedance is far less than the resistance of resistors 62 and 48. But this current derived from winding section 92 opposes in the primary winding of transformer 59 the current derived from winding section 87, so that the secondary potential between terminals 63 and 66 is reduced, reducing the positive potential on control grid 18 and reducing the conductivity of rectifier 16 during its conducting half cycle. Similarly the conductivity of triode 68 reduces the current in the primary winding of transformer 59 between terminals 58 and 61, thereby reducing the conductivity of rectifier 17 during its conducting half cycle.

Automatic regulation of the input voltage to load 26 occurs as follows. If, for example, the potential of load input conductor 24 increases, the potential at the voltage divider junction 36 increases representatively, which increases the potential of the conductor 37. This increases the potential applied to triode grids 77 and 78, increasing the current flow through these tubes. This in turn increases the corrective currents flowing from junction 61 through both halves of the primary winding of transformer 59, thus reducing the net currents therein and therefore reducing the positive potentials applied to the control grids 18 and 19 of the rectifier tubes 16 and 17, reducing their current flow and increasing their internal potential drop. This reduces the potential on load input conductor 24 to an extent which substantially neutralizes the postulated increase of its potential.

Similar action with opposite control sense at triodes 16 and 17 is obtained by inserting an inverter, such as one stage of electronic amplification, in tandem in control conductor 37. It is also necessary to reverse the conductors on transformer terminals 63 and 64. In this case tubes 16 and 17 are initially biased for decreased conduction, with the respective grids more negative than the associated cathodes during the conducting half cycle. Increase of load potential will cause an increase of potential at terminal 36 but because of the inverter a decrease at terminal 82. The triodes 67 and 68 therefore become less conductive, causing terminals 63 and 64 to become more negative during respective conducting half cycles of triodes 16 and 17, thus causing a decrease in load potential to neutralize the initiating increase.

What is claimed is:

1. A regulated power supply comprising, an alternating current source, a direct current load circuit, a full wave rectifier circuit including a pair of high vacuum tubes each having anode, cathode and control electrodes interconnecting said alternating current source and said load circuit, first and second discharge tubes each having anode, cathode and control electrodes, a first transformer having its primary energized by said alternating current source and having a pair of midtapped secondary windings, the end terminals of one of said secondary windings being interconnected through a series circuit including the anode-cathode path of said first discharge tube and a first rectifier, the end terminals of the other of said secondary windings being interconnected through a second series circuit including the anode-cathode path of said second discharge tube and a second rectifier, a second transformer having a midtapped primary and a midtapped secondary, the end terminals of the primary of said second transformer being connected to the respective midtapped terminals of the secondary windings of said first transformer and the midtap terminal of said second transformer primary being connected to the cathodes of said first and second discharge tubes, the end terminals of the secondary of said second transformer being respectively connected to the control electrodes of said pair of high vacuum tubes and the center tap connected to the cathodes thereof and means for jointly applying a control potential to control electrodes of said first and second discharge tubes.

2. A regulated power supply comprising, an alternating current source, a direct current load circuit, a full wave rectifier circuit including a pair of high vacuum tubes each having anode, cathode and control electrodes interconnecting said alternating current source and said load circuit, first and second discharge tubes each having anode, cathode and control electrodes, a first transformer having its primary energized by said alternating current source and having a pair of midtapped secondary windings, the end terminals of one of said secondary windings being interconnected through a series circuit including the anode-cathode path of said first discharge tube and a first rectifier, the end terminals of the other of said secondary windings being interconnected through a second series circuit including the anode-cathode path of said second discharge tube and a second rectifier, a second transformer having a midtapped primary and a midtapped secondary, the end terminals of the primary of said second transformer being connected to the respective midtapped terminals of the secondary windings of said first transformer and the midtap terminal of said second transformer primary being connected to the cathodes of said first and second discharge tubes, the end terminals of the secondary of said second transformer being respectively connected to the control electrodes of said pair of high vacuum tubes and the center tap connected to the cathodes thereof, means for deriving a control potential from said load circuit the magnitude of which is dependent on the magnitude of the potential impressed on said load circuit, and means for adjusting the bias of said first and second discharge tubes as a function of said control potential.

3. A regulated power supply comprising, an alternating current source, a direct current load circuit, a full wave rectifier circuit including a pair of high vacuum tubes each having anode, cathode and control electrodes interconnecting said alternating current source and said load circuit, first and second discharge tubes each including anode, cathode and control electrodes, a first transformer having its primary energized by said alternating current source and having a pair of midtapped secondary windings, the end terminals of one of said secondary windings being interconnected through a series circuit including the anode-cathode path of said first discharge tube and a first rectifier, the end terminals of the other of said secondary windings being interconnected through a second series circuit including the anode-cathode path of said second discharge tube and a second rectifier, a second transformer having a midtapped primary and a midtapped secondary, the end terminals of the primary of said second transformer being connected to the respective midtapped terminals of the secondary windings of said first transformer and the midtap terminal of said second transformer primary being connected to the cathodes of said first and second discharge tubes, the end terminals of the secondary of said second transformer being respectively connected to the control electrodes of said pair of high vacuum tubes and the center tap connected to the cathodes thereof, a pair of resistors connected in series between the control electrodes of said first and second discharge tubes, and means for applying a direct current control potential to the common junction of said series resistors.

4. A regulated power supply comprising, an alternating current source, a direct current load circuit, a full wave rectifier circuit including a pair of high vacuum tubes each having anode, cathode and control electrodes interconnecting said alternating current source and said load circuit, first and second discharge tubes each including anode, cathode and control electrodes, a first transformer having its primary energized by said alternating current source and having a pair of midtapped secondary windings, the end terminals of one of said secondary windings being interconnected through a series circuit including the anode-cathode path of said first discharge tube and a first rectifier, the end terminals of the other of said secondary windings being interconnected through a second series circuit including the anode-cathode path of said second discharge tube and a second rectifier, a second transformer having a midtapped primary and a midtapped secondary, the end terminals of the primary of said second transformer being connected to the respective midtapped terminals of the secondary windings of said first transformer and the midtap terminal of said second transformer primary being connected to the cathodes of said first and second discharge tubes, the end terminals of the secondary of said second transformer being respectively connected to the control electrodes of said pair of high vacuum tubes and the center tap connected to the cathodes thereof, a pair of resistors connected in series between the control electrodes of said first and second discharge tubes, means for deriving a direct potential from said load circuit the magnitude of which is a function of the potential impressed thereon and means for impressing said control potential on the common junction of said series resistors.

References Cited in the file of this patent

UNITED STATES PATENTS

| | | |
|---|---|---|
| 2,195,121 | Moyer | Mar. 26, 1940 |
| 2,273,586 | Moyer | Feb. 17, 1942 |
| 2,315,619 | Hutcheson et al. | Apr. 6, 1943 |